Figure 1:
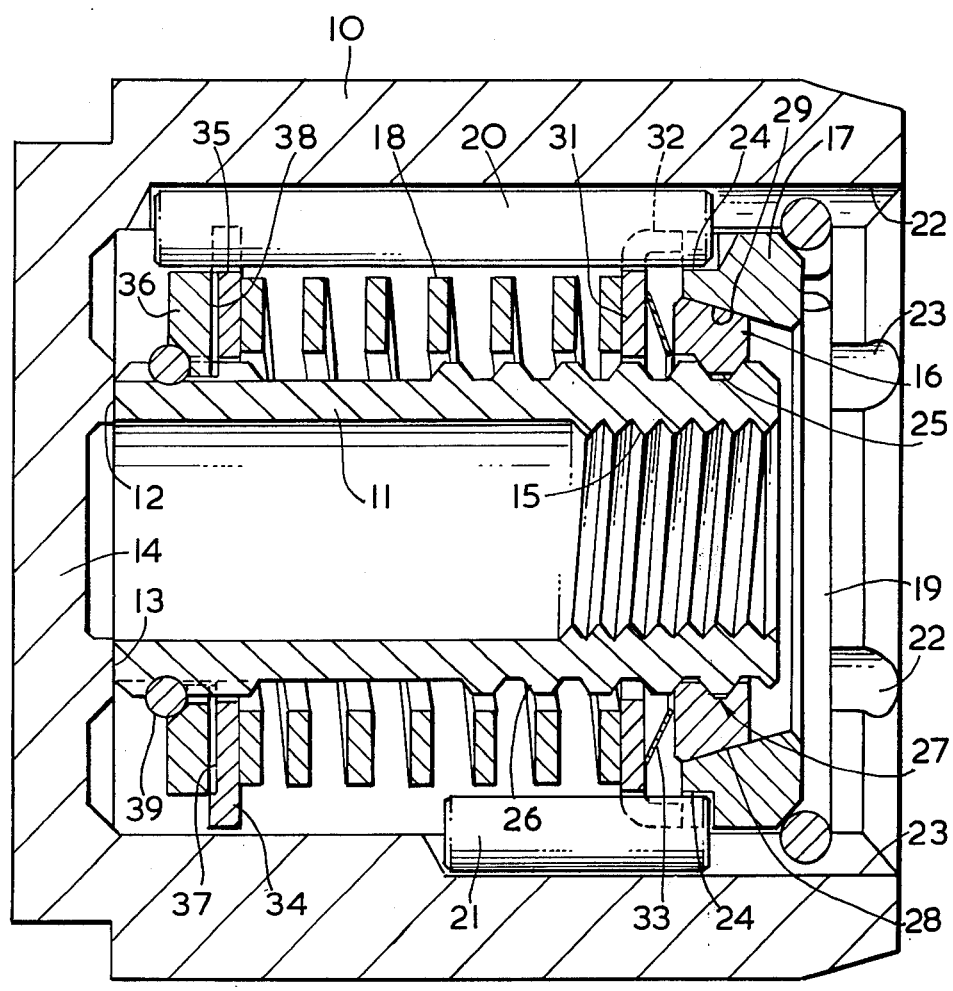

United States Patent [19]
Harrison

[11] 3,900,085
[45] Aug. 19, 1975

[54] IMPROVEMENT RELATING TO BRAKE ADJUSTERS

[75] Inventor: Anthony William Harrison, Birmingham, England

[73] Assignee: Girling Limited, Birmingham, England

[22] Filed: Mar. 19, 1974

[21] Appl. No.: 452,560

[30] Foreign Application Priority Data
Mar. 20, 1973 United Kingdom............. 13204/73

[52] U.S. Cl............................. 188/196 D; 188/71.9
[51] Int. Cl............................................. F16d 65/56
[58] Field of Search............ 188/71.9, 106 F, 196 D

[56] References Cited
UNITED STATES PATENTS

| | | | |
|---|---|---|---|
| 3,550,732 | 12/1970 | Beller............................ | 188/196 D |
| 3,770,082 | 11/1973 | Brooks et al..................... | 188/71.9 |
| 3,774,733 | 11/1973 | Farr.............................. | 188/196 D |

*Primary Examiner*—Duane A. Reger
*Attorney, Agent, or Firm*—Scrivener Parker Scrivener and Clarke

[57] ABSTRACT

An abutment assembly for a piston, e.g. of a hydraulic brake actuator has a nut screw-threaded on a nut and a drive ring meshing with the nut through a reversible screw-thread connection and engaging the piston under spring bias at conical friction surfaces. Differential control means in the form of a slipping ratchet clutch is provided to prevent undesired rotation of the nut due to blows applied to the nut by the piston during knock-back.

16 Claims, 4 Drawing Figures

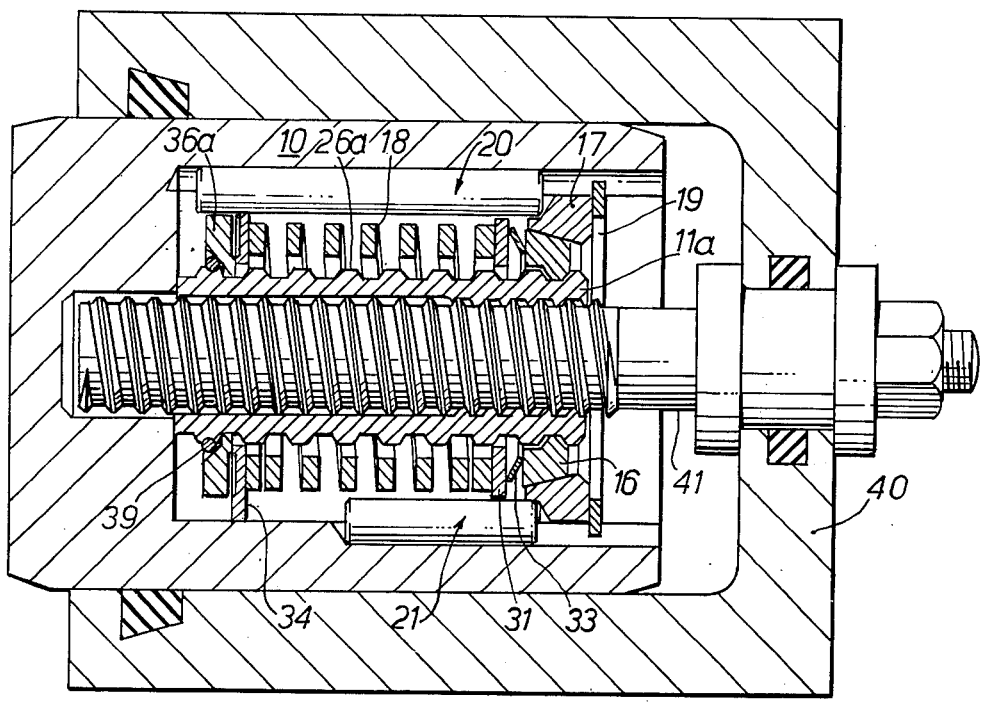
-FIG.2.-

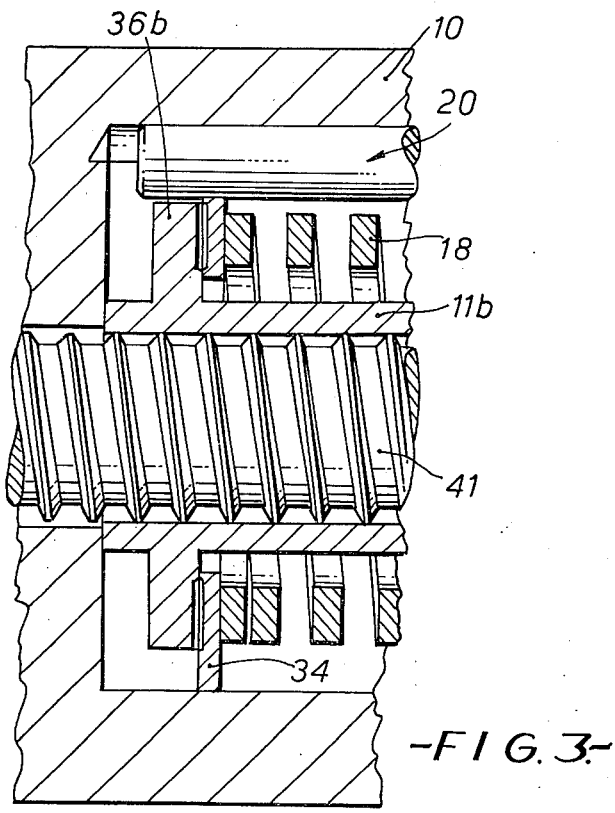
-FIG.3.-
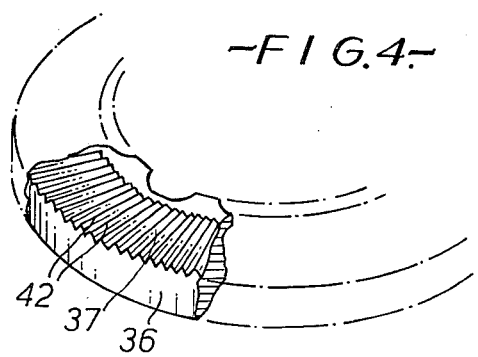
-FIG.4.-

IMPROVEMENT RELATING TO BRAKE ADJUSTERS

This invention relates to abutment assemblies, and in particular to an abutment assembly engageable by a piston to determine the retracted position of the piston.

Problems with such abutment assemblies arise in ensuring that the assembly steadily advances to successive new positions catering for wear of the piston operated component (such as a disc brake friction pad) so that excess piston movement and hydraulic fluid requirement is prevented, and in maintaining the new position despite impact loading from the piston.

In accordance with the present invention a slack adjuster for the piston of a hydraulic brake actuator comprises a rotatable nut coaxial with the piston and having an internal screw thread to mate with an external thread on a non-rotatable strut and so form a non-reversible screw-thread connection, said nut being axially displaceable and rotatable relative to said piston; a drive ring also coaxial with said piston and encircling said nut; a reversible screw-thread connection effective between said drive ring and either said nut or said piston; cooperating friction surfaces effective between said drive ring and either said piston or said nut, respectively; resilient means axially biassing said drive ring in a direction to urge said friction surfaces towards one another; and differential control means permitting rotation of the nut by the drive ring for adjustment but restraining reverse rotation of the nut during impact loading of the nut by the piston.

Preferably the drive ring has the reversible screwthread connection with the nut and is resiliently biassed into clutching engagement with the piston at the friction surfaces.

A reversible screw-thread connection between two members is a connection such that axial displacement of one member causes rotation of the other member and vice versa whereas a non-reversible screw-thread connection between two members is one in which an axial force applied to one member cannot normally cause relative rotation between the members. Whether a screw-thread connection is reversible or not depends upon the pith and flank angles of the thread and the coefficient of friction between the members.

The invention is further described, by way of example, with reference to the accompanying drawings, in which:

FIG. 1 is a longitudinal section of a hydraulic brake actuator piston fitted with a slack adjuster according to the invention, FIG. 2 is a similar section showing a modification to the slack adjuster, FIG. 3 is a fragmentary view showing another modification to the slack adjuster, and FIG. 4 is a fragmentary perspective view of a control washer of FIG. 1.

Referring to the drawing, a hollow piston 10 of a hydraulic actuator for a disc brake is slidable in a bore of a cylinder body (not shown in FIG. 1, but see cylinder body 40 in FIG. 2). A nut 11 of the slack adjuster has an abutment surface 12 mating with a complementary abutment surface 13 on the end wall 14 of the piston 10. The nut 11 has an internal thread 15 which can mate with an external thread on a strut (not shown) to form a right-hand non-reversible screw-thread connection. The strut bears against a cam journalled in the cylinder body or in another piston opposed to the piston 10 and is slidably sealed to the cylinder body or further piston at a diameter which is small compared with the piston diameter. The cam serves as a mechanical actuator for handbrake operation and provides a stop for the strut when the handbrake is not actuated. Reference may be made to German Patent Application (Offenlegungsschrift) No. P 2239602 and British Patent Specification No. 1179235 for a fuller description of the strut and the handbrake cam.

The automatic adjuster includes a drive ring 16 which encircles the nut 11 and a fixed ring 17 which is fixed inside the piston 10 by being biassed by a heavy spring 18 against a spring ring 19 snap-fitted in an annular groove in the piston. Three dowels 20 and three dowels 21 are received in longitudinal grooves 22 and 23, respectively, inside the piston 10 and the fixed ring 17 has notches 24 in which the right-hand ends of the dowels 20 and 21 are received. The dowels 20 and 21 thereby act as key members to prevent rotation of the fixed ring 17.

The drive ring 16 has an internal screw thread 25 meshing with an external screw thread 26 on the nut 11 to form a left-hand reversible screw-thread connection 27. The drive ring 16 has an external frusto-conical friction surface 28 mating with an internal frusto-conical friction surface 29 in the fixed ring 30. A spring abutment washer 31 is disposed between the right-hand end of the spring 18 and the fixed ring 17 and has cranked-fingers 32 which straddle the dowels 20 and 21 and bear against the fixed ring 21. A wavy washer spring 33, which is weaker than the spring 18, acts between the abutment washer 31 and the drive ring 17 and acts to urge the friction surfaces 28 and 21 into engagement with one another and hold them in engagement with one another in the resting state of the hydraulic actuator.

The adjuster includes a differential control means for preventing rotation of the nut 11 through shock loading or knock-back from the piston 14 when the brake is not operated, whilst permitting rotation of the nut 11 under the influence of the drive ring 16 as described hereinafter. The differential control means comprises a first control washer 34, having three peripheral notches 35 in which the three dowels 20 are received to prevent rotation of the control washer 34, and a second control washer 36 fixed relative to the nut 11. The control washers 34 and 36 encircle the nut 11 and have mating faces 37 and 38 formed with radial serrations or corrugations and urged together by the heavy spring 18 whose left-hand end bears against the first control washer 34. FIG. 4 shows such radial serrations 42 on the face 37 of the washer 36 and the radial serrations on the washer 36 are similar. The second control washer 36 is held by the bias of the spring 18 against a spring ring 39 fitted in a peripheral groove in the nut 11 and is also splined to the nut 11. Alternatively as shown in FIG. 2 in which parts like those of FIG. 1 are denoted by like reference numerals, the external thread 26a could continue to the left-hand end of the nut 11a and the washer 36a could mesh with the thread 26a to prevent rotation of the nut 11 relative to the washer 36a. In a further alternative as shown in FIG. 3, the control washer 36a is an integral part of the nut 11b. It will be noted that the spring 18 also acts to urge the abutment surfaces 12 and 13 against one another.

Upon application of hydraulic pressure to the actuator, the piston 10 is urged to the left whereas the strut 41 (FIG. 2) is urged to the right. So long as brake lining wear has not taken place, the relative travel between the strut and the nut 11, which moves with the piston 10 under the influence of the spring 18, is insufficient to take up axial clearance provided for the purpose at the non-reversible screw-thread connection between the strut and the nut 11. If lining wear should take place this axial thread clearance is taken up and the hydraulic pressure acting rightwards on the strut (as will be understood from the above-mentioned specifications) will draw the nut 11 to the right against the force of the spring 18 and separating the abutment surfaces 12 and 13. The drive ring 16 is prevented from rotating by the conical friction surfaces 28 and 29 acting as a friction brake under the influence of the spring washer 33. The reversible screw-thread connection 27 therefore causes the nut 11 to rotate, upon rightward displacement of the latter, in a direction to unscrew it slightly on the strut. When the brake is released, the spring 18 retracts the nut 11 to the left, i.e. in a direction tending to part the friction surfaces 28 and 29 which reduces the frictional torque resisting rotation of the drive ring 16 to a relatively low value, i.e. a value less than the frictional torque resisting rotation of the nut 11. The reversible screwthread connection 27, under leftward movement of the nut 11, therefore causes the drive ring 16 to turn until the abutment surfaces 12 and 13 come together with the nut 11 in its newly adjusted position.

The adjuster is of the so-called incremental type in that the adjustment effected during a single adjusting cycle is less than the lining wear which caused the adjusting cycle. The necessary adjustment is completed during subsequent braking operations.

The radial serrations 42 (FIG. 4) on the control washers 34 and 36 are in the form of radial ribs with inclined flanks. Turning of the washers 34 and 36 therefore tends to move these washers away from one another against the force of the spring 18. Upon knockback of the piston 10, the surfaces 12 and 13 momentarily separate due to the bounce effect. Should the nut 11 turn slightly during the bounce, the effect of the radial serrations is to turn the nut back to its previous position. Mal-adjustment due to knock-back is thereby substantially avoided.

The control washers 34 and 36 therefore behave as a slipping ratchet clutch which permits the nut 11 to turn only during the appropriate part of an adjustment cycle. The control washers 34 and 36, besides serving an anti-knockback function also assist in resisting rotation of the nut 11 in that part of an adjustment cycle in which the drive ring 17 is turned.

The dowels 20 and 21 in their grooves 22 and 23 are equi-circumferentially spaced with the dowels 20 alternating with the dowels 21. The three dowels 21 are substantially shorter than the dowels 20 and serve as limit stops for the washer 34 to limit compression of the spring 18 if substantial travel of the nut 11 should take place in exceptional circumstances, e.g. brake actuation with the brake pads removed.

In an alternative arrangement of the drive ring 17, the drive ring has an external screw thread meshing with an internal thread in the fixed ring 17 to form the reversible screw-thread connection and has an internal conical friction surface mating with an external conical friction surface on the nut 11 to form a friction clutch. Such a construction can be found in U.S.A. Pat. No. 3,774,733 to Farr.

In a further alternative, as will be obvious to one skilled in the art from said U.S.A. Pat. No. 3,774,733, the conical friction surfaces 28 and 29 slope the other way, the spring washer 33 is disposed at the right hand side of the drive ring and acts to the left on the latter and the reversible screw-thread connection 27 is of the same hand as the non-reversible screw-thread connection. In this case, during an adjustment cycle, the drive ring rotates during brake application and the nut turns upon brake release.

During handbrake operation the above-mentioned cam acts upon the strut and thereby via the non-reversible screwthread connection, the nut 11 and the abutment surfaces 12 and 13 on the piston 10 to apply the brake mechanically.

If the handbrake cam is omitted, the strut is attached to or forms an integral part of the cylinder body or counterpiston, as the case may be.

I claim:

1. In a piston for a hydraulic brake actuator: a slack adjuster for determining the retracted position of said piston comprising a non-rotatable strut having external screw-thread; a rotatable nut coaxial with the piston and having an internal screw-thread to mate with the external thread on said strut and so form a non-reversible screw-thread connection, said nut being axially displaceable and rotatable relative to said piston; a drive ring also coaxial with said piston and encircling said nut; a reversible screw-thread connection effective between said drive ring and one of said nut and piston; cooperating friction surfaces effective between said drive ring and the other of said piston and nut; resilient means axially biasing said drive ring in a direction to urge said friction surfaces towards one another; and differential control means permitting rotation of said nut by said drive ring for adjustment but restraining reverse rotation of the nut during impact loading of the nut by the piston.

2. A slack adjuster according to claim 1 in which said differential control means comprises a first control member non-rotatable relative to said piston, a second control member non-rotatable relative to said nut, said control members having mating radially serrated surfaces, and means spring biasing said serrated surfaces towards one another to form a slipping-ratchet clutch which does not hinder rotation of said nut for adjustment but does inhibit rotation of said nut during impact loading from said piston.

3. A slack adjuster according to claim 2 in which said control members are annular and encircle said nut.

4. A slack adjuster according to claim 2 in which said spring biassing means comprises an abutment in said piston and a spring acting between said abutment and said first control member to bias the serrated surfaces together.

5. A slack adjuster according to claim 4 in which said nut has an abutment thereon and said spring biasses said second control member against said abutment on said nut.

6. A slack adjuster according to claim 4 in which said second control member is formed integral with said nut.

7. A slack adjuster according to claim 4 in which said piston is hollow and has a plurality of internal longitudinal grooves therein, key members being received in said longitudinal grooves, and in which said first control member has external notches slidably received over said key members to prevent rotation of said first control member.

8. A slack adjuster according to claim 7 in which said hollow piston has further longitudinal grooves therein, relatively short key members being received in said further longitudinal grooves and serving as a limit stop for engagement by said first control member to limit compression of said spring.

9. A slack adjuster according to claim 7 further comprising a fixed ring in said hollow piston and a stop in said piston, said fixed ring being urged by said spring against said stop in said piston and having external notches in which said key members are received, said fixed ring having thereon the one of said friction surfaces and threads of said reversible screw-thread connection associated with said piston.

10. A slack adjuster according to claim 4 in which said nut and said piston have complementary mating abutment surfaces and in which said spring acting on said first control member is effective to urge said abutment surfaces into engagement with one another in the released state of the brake actuator.

11. A slack adjuster according to claim 1, in which said friction surfaces are in engagement with one another under the bias of said resilient means in the released state of the brake actuator.

12. A slack adjuster according to claim 1 in which at least one of said friction surfaces is conical.

13. A slack adjuster according to claim 1 wherein said reversible screw-thread connection is disposed between said drive ring and said nut and comprises an internal thread inside said drive ring mating with an external thread around said nut and wherein said cooperating friction surfaces comprise an external annular surface around said drive ring cooperating with an internal annular surface fixed relative to said piston.

14. A slack adjuster according to claim 1 in which the first-mentioned resilient means comprises a spring washer bearing against said drive ring.

15. A slack adjuster according to claim 1 in which said reversible screw thread connection comprises mating multi-start threads.

16. A slack adjuster according to claim 1 in which at least a preponderance of the desired normal brake slack is accommodated by axial clearance at at least one of said screw-thread connections.

* * * * *